United States Patent

Shinomoto et al.

Patent Number: 5,498,359
Date of Patent: Mar. 12, 1996

[54] LUBRICANT

[75] Inventors: Sayaka Shinomoto, Kyoto; Kenji Kohno; Yuko Uetani, both of Ibaraki; Noboru Isoe, Shiga; Kazushi Miyata, Osaka, all of Japan

[73] Assignee: Hitachi Maxell, Ltd., Osaka, Japan

[21] Appl. No.: 325,258

[22] PCT Filed: Feb. 23, 1994

[86] PCT No.: PCT/JP94/00279

§ 371 Date: Oct. 24, 1994

§ 102(e) Date: Oct. 24, 1994

[87] PCT Pub. No.: WO94/19433

PCT Pub. Date: Sep. 1, 1994

[30] Foreign Application Priority Data

| Feb. 24, 1993 | [JP] | Japan | 5-061059 |
| Nov. 25, 1993 | [JP] | Japan | 5-321133 |
| Dec. 7, 1993 | [JP] | Japan | 5-340466 |

[51] Int. Cl.$^6$ .............................. C10M 107/38
[52] U.S. Cl. .................. 252/54; 252/58; 568/615
[58] Field of Search ............................ 252/54

[56] References Cited

U.S. PATENT DOCUMENTS

| 3,980,715 | 9/1976 | Szur | 252/54 |
| 4,267,238 | 5/1981 | Chernega | 428/422 |
| 4,268,556 | 5/1981 | Pedrotty | 428/65 |
| 4,735,848 | 4/1988 | Kondo et al. | 428/219 |
| 4,786,551 | 11/1988 | Ootani et al. | 428/323 |
| 4,826,614 | 5/1989 | Watanabe | 252/54 |
| 4,828,924 | 5/1989 | Shoji et al. | 428/422 |
| 4,847,156 | 7/1989 | Nishikawa et al. | 428/425.9 |
| 5,071,715 | 12/1991 | Shoji et al. | 428/694 |
| 5,137,650 | 8/1992 | Kaneko | 252/54 |
| 5,214,216 | 5/1993 | Tohzuka et al. | 568/615 |
| 5,223,342 | 6/1993 | Shoji et al. | 428/413 |
| 5,227,516 | 7/1993 | Tohzuka et al. | 560/182 |
| 5,374,480 | 12/1994 | Nishikawa et al. | 428/336 |

FOREIGN PATENT DOCUMENTS

| 60-85427 | 5/1985 | Japan. |
| 2-49128 | 2/1990 | Japan. |
| 2-78016 | 3/1990 | Japan. |
| 2-210615 | 8/1990 | Japan. |

*Primary Examiner*—Ellen M. McAvoy
*Attorney, Agent, or Firm*—Birch, Stewart, Kolasch & Birch

[57] ABSTRACT

A lubricant compound which comprises carbon, hydrogen, fluorine and etheric oxygen atoms and which contains perfluoropolyether chain of the formula (A), a perfluoroalkyl chain of the formula (B) and a polyether chain of the formula (C) in combinations of (A) and (C), (B) and (C), or (A) and (C) and of (B) and (C), in a molecule wherein:

A is —$(C_nF_{2n}O)_m$—,
wherein n is an integer of 1 to 10 and m is an integer of at least 1;

B is —$C_nF_{2n}$—,
wherein n is an integer of 1 to 15, and

C is —$(C_nH_{2n}O)_m$—,
wherein n is an integer of 1 to 6 and m is an integer of at least 1.

5 Claims, 4 Drawing Sheets

P P M 5,498,359

LUBRICANT

BACKGROUND OF THE INVENTION

1. Field of the Invention

The present invention relates to a lubricant. In particular, the present invention relates to a lubricant which has a stable lubrication property for a long time.

2. Description of the Related Art

Since a fluorine based lubricant has in general excellent lubrication properties while it is expensive demands for fluorine base lubricants are increasing in various fields, particularly in fields which require a high lubrication property, though the used amount of lubricant is small.

The magnetic recording media is one typical example of such a field. In particular, the fluorine based lubricant is indispensable for the ferromagnetic metal thin film magnetic recording medium which has excellent high density recording properties, because its magnetization resistance is easily increased and its thickness easily decreased, while its surface smoothness is high, no binder resin having toughness being used, so the coefficient of friction against a magnetic head is large. Thus, the thin film medium is easily abraded or damaged in comparison with a coating type magnetic recording medium which is prepared by coating a magnetic paint comprising a magnetic powder, a binder resin, an organic solvent and other necessary components on a nonmagnetic support and drying the paint.

For example, the durability and traveling property are improved by using a perfluoropolyether lubricant or a partially fluorinated carboxylic acid ester lubricant by adding it in a magnetic layer or applying it on the ferromagnetic metal thin film (cf. Japanese Patent KOKAI Publications No. 236118/1987 and 210615/1990).

However, by the addition of the conventional perfluoropolyether lubricant or partially fluorinated carboxylic acid ester to the magnetic layer, the durability is not sufficiently increased. When such a lubricant is applied on the ferromagnetic metal thin film, the lubricating effect is not sufficient and adequate reliability is not attained under severe conditions, such as a static picture, namely a still state in which the same part of the medium is continuously contacted to a magnetic head, since the holding force of the lubricant on the ferromagnetic metal thin film is low even though it has an excellent lubrication effect.

It is proposed to introduce a polar functional group, such as a hydroxyl group, or an ester group at a molecular end of the perfluoropolyether so that the lubricant is firmly chemically absorbed on the surface of the ferromagnetic metal thin film (cf. Japanese Patent Publication No. 10368/1985). However, such a perfluoropolyether lubricant is dissolvable only in an expensive solvent, such as FREON (a trademark) or a perfluoroalkane, and its cost is uneconomical. Further, since hydrofluoric acid is generated by pyrolysis during the recovery of a such lubricant, the working safety deteriorates. In addition, the use of a solvent containing a large amount of halogens is undesirable in view of the protection of the global environment.

In recent years, a fluorine based lubricant which can be dissolved in a hydrocarbon solvent instead of the special fluorine base solvent has been developed. For example, a compound comprising a long chain hydrocarbon group bonded to a molecular terminal of a perfluoropolyether through an amide bond or an ester bond (cf. Japanese Patent KOKAI Publication Nos. 78016/1990 and 49128/1990).

However, in the above compound comprising a long chain hydrocarbon group bonded to a molecular terminal of a perfluoropolyether through an amide bond or an ester bond, the amide or ester bond is easily hydrolyzed on a metal surface having high chemical activity, and an acid, which is generated by the hydrolysis, corrodes the metal surface or forms a viscous salt. Therefore, the lubrication property is deteriorates.

SUMMARY OF THE INVENTION

An object of the present invention is to provide a lubricant compound which can solve the above problems and has a stable lubrication property for a long time when it is used as a lubricant in a magnetic recording medium.

According to the present invention, there is provided a lubricant compound comprising carbon, hydrogen, fluorine and etheric oxygen atoms, containing a perfluoropolyether chain of the formula (A):

$$—(C_nF_{2n}O)_m— \quad (A)$$

wherein in n is an integer of 1 to 10 and m is an integer of at least 1, a perfluoroalkyl chain of the formula (B):

$$—C_nF_{2n}— \quad (B)$$

wherein n is an integer of 1 to 15, and a polyether chain of the formula (C):

$$—(C_nH_{2n}O)_m— \quad (C)$$

wherein n is an integer of 1 to 6 and m is an integer of at least 1, in a combination of (A) and (C), a combination of (B) and (C), or combinations of (A) and (C) and (B) and (C), in a molecule.

This lubricant has a lubrication property of stability which lasts for a long time. For example, in the case of a magnetic recording medium, when this lubricant is used in a magnetic recording medium having a magnetic layer on one surface or both surfaces of a nonmagnetic substrate, durability under severe conditions is sufficiently improved, and the magnetic recording medium maintains high reliability for a long time under the severe conditions.

DETAILED DESCRIPTION OF THE INVENTION

Figure 1:
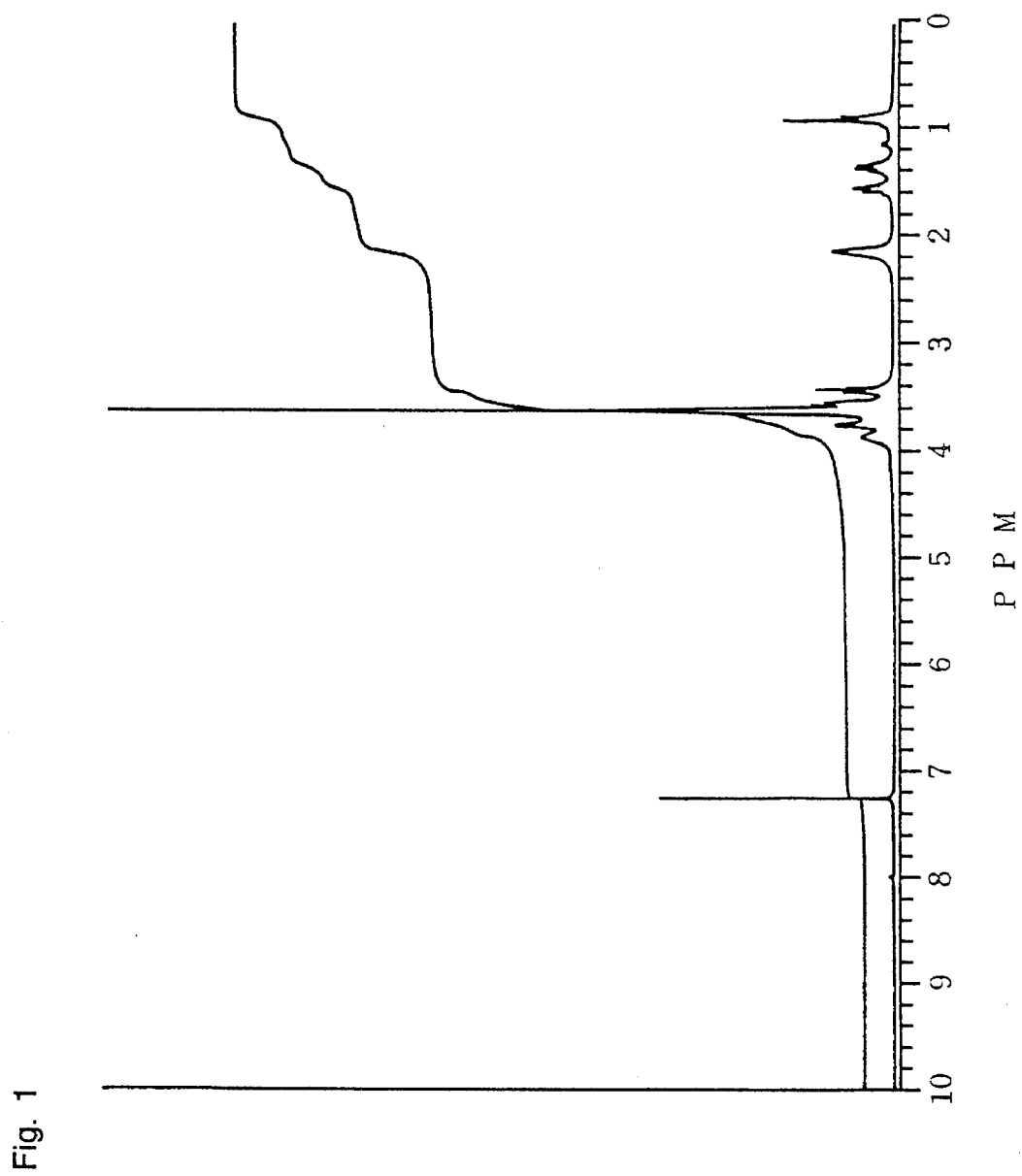
FIG. 1 is a NMR spectrum of a lubricant prepared in Example 5.

The lubricant compound of the present invention containing a combination of the perfluoropolyether chain and the polyether chain and/or a combination of the perfluoroalkyl chain and the polyether chain easily dissolves in a generally used hydrocarbon solvent, since the polyether chain acts as a solubilizing agent. Further, since the polyether chain has a suitable polarity, the lubricant has good affinity for a magnetic powder. When it is used on the ferromagnetic metal thin film, a suitable interaction between the lubricant and the ferromagnetic metal thin film is generated so that the lubricant can be stably retained on a surface of the metal thin film. In addition, since the molecule contains only the ether bonds which are chemically stable, it does not decompose when it is absorbed on the active metal surface. The perfluoropolyether and perfluoroalkyl moieties have excellent lubrication properties.

When the lubricant molecule has a group such as —Cl, or —OR$_1$ in which R$_1$ is an alkyl or fluoroalkyl group having 1 to 18 carbon atoms, or —OSi(CH$_3$)$_2$R$_2$ in which R$_2$ is an alkyl group having from 1 to 30 carbon atoms, but no functional group having from a strong polarity such as a hydroxyl group, a carboxyl group, an amino group, a sulfonic acid group or their salts, the lubricant is excellent in solubility in common hydrocarbon solvents such as ketones, and does not lose its corrosion resistance property because of low hydrophilicity.

When such a lubricant is contained in the magnetic layer, it can be uniformly dispersed in the magnetic layer and exhibits an excellent lubrication property under severe conditions so that the still durability is sufficiently improved. When such a lubricant is present on the ferromagnetic metal thin film, it is resistant to strong sliding contact against a magnetic head and maintains an excellent lubrication property for a sufficient time under severe conditions so that the still durability is enhanced, the corrosion resistance is good, and high reliability is maintained for a long period of time.

Since the conventional perfluoropolyether base lubricant is not soluble in generally used organic solvents, it cannot be contained in the magnetic layer. Further, the conventional lubricant has a polar functional group only at the molecular end, and it cannot be stably retained on the surface of the ferromagnetic metal thin film so that sufficient still durability cannot be achieved under the severed conditions.

Since the conventional perfluoropolyether or partially fluorinated carboxylic acid ester lubricant has a polar functional group such as a carboxyl group, a sulfonic acid group, a phosphoric acid ester or an ester group, the lubricant reacts with the metal surface and corrodes the metal surface or it forms a viscous salt so that the lubrication property deteriorates. While the functional group, such as the hydroxyl group, has less reactivity with the metal surface, it is absorbed onto the metal surface too strongly so that the sufficient still durability is not achieved under severe conditions.

As the lubricant of the present invention containing a combination of the perfluoropolyether chain and the polyether chain and/or a combination of the perfluoroalkyl chain and the polyether chain, there is exemplified a compound comprising an alkyl group having at least one ether bond including a linking part ether bond and no polar functional group which alkyl group is bonded to at least one molecular end of the perfluoropolyether or perfluoroalkyl chain. An example of the molecular end group is a group of the formula:

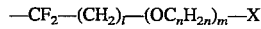

wherein X is —Cl, or —OR$_1$ in which R$_1$ is an alkyl or fluoroalkyl group having from 1 to 18 carbon atoms, or —OSi(CH$_3$)$_2$R$_2$ in which R$_2$ is an alkyl group having from 1 to 30 carbon atoms, and each of l, m and n is 0 or an integer of at least 1.

Since this kind of lubricant is a compound analogous to a block copolymer, a balance between the fluorocarbon moiety and the hydrocarbon moiety is important. When the lubricant has a structure having the perfluoropolyether group in a middle part and the fluorine-free polyether and the alkyl group at the ends of the molecule, preferably the perfluoropolyether moiety will have a molecular weight of not larger than 10,000, in particular 300 to 5000, in view of the lubrication property, solubility, viscosity and so on.

Preferably, the fluorine-free polyether or alkyl group has a Y value satisfying $0.5 \leq Y \leq 3.0$, wherein Y is a value obtained by dividing 100s (in which s is the total number of carbon atoms and oxygen atoms of the group) by an average molecular weight of the perfluoropolyether. When Y is smaller than 0.5, both the solubility and the absorbance are not improved by the polyether, while when Y exceeds 3.0, the excellent lubrication property due to the fluorine atoms may not be sufficiently achieved.

A whole molecular weight of the lubricant having the combination of the perfluoropolyether chain and the polyether chain or the combination of the perfluoroalkyl chain and the polyether chain is preferably from 300 to 10,000. When the molecular weight is too small, the lubricant is easily evaporated, while when it is too large, the lubricant is so viscous so that the lubrication property deteriorates.

As the perfluoropolyether chain of the lubricant, preferably a perfluoropolyether chain is provided having a backbone of the formula:

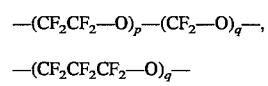

or

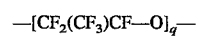

wherein p and q is an integer of from 10 to 500.

As the perfluoroalkyl chain, preferably a perfluoroalkyl chain having a backbone of the formula:

wherein n is an integer of 1 to 15, is used.

As the polyether chain, preferably a polyether chain having a backbone of the formula:

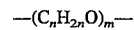

wherein n is an integer of 1 to 6, and m is an integer of at least 1, is used.

The lubricant may be synthesized by any one of a number of synthesis methods. In a technically advantageous synthesis method, for example, an ether moiety is synthesized by reacting propylene oxide and a perfluoropolyether compound having a hydroxyl group as a terminal functional group under atmospheric pressure or in an autoclave. Alternatively, an ether bond can be formed from a carbonate compound.

The alkyl terminal group may be synthesized, for example, by reacting the terminal hydroxyl group and a halogenated alkyl compound in the presence of an alkali.

The lubricant may be used independently, or as a mixture of two or more lubricants. When a lubricant comprising the perfluoropolyether chain and having a molecular weight of about 2000 and a lubricant comprising the perfluoroalkyl chain having a molecular weight of from 600 to 800 are used in combination, an excellent lubricating effect is achieved.

In some cases, the lubricant of the present invention may be used together with other lubricants. For example, the lubricant of the present invention can be used with an aliphatic acid or its metal salt, an aliphatic ester, an aliphatic amide, an aliphatic alcohol, a monosulfide, a paraffine, a silicone compound, an ester of an aliphatic acid and a fluoride, other perfluoropolyether, a fine powder of a polytetrafluoroethylene or the like, a molybdenum or graphite base inorganic lubricant fine powder, with good compatibility.

When the lubricant of the present invention is used as the lubricant for a magnetic recording medium, it is dissolved in a fluorine base solvent, such as FREON or a hydrocarbon solvent, such as tetrahydrofuran, methyl ethyl ketone, isopropanol or the like, and coated or sprayed on the magnetic layer which has been formed on a nonmagnetic substrate, such as a polyethylene terephthalate film or a polyamide film, and dried. Alternatively, the magnetic layer is dipped in the above solution and dried. Further, the lubricant may be introduced into the magnetic layer by transfer.

In another embodiment, the lubricant of the present invention may be mixed and dispersed together with the magnetic powder, the binder resin, the organic solvent and other necessary components to prepare a magnetic paint, and then the magnetic paint applied on the nonmagnetic substrate, such as a polyethylene terephthalate, by spraying or roll coating and dried to form the magnetic layer.

When the magnetic layer on which the lubricant is present is a ferromagnetic metal think film, the surface of the metal thin film may have a slight amount of moisture. Further, a rust preventive, such as a benzotriazole type rust preventive or a protective layer, such as a thin film or a discontinuously present film which is formed from an organic compound or silicon oxide by vacuum deposition, sputtering, CVD or plasma, may be present.

An amount of the lubricant which is used in the magnetic recording medium is from 0.1 to 20 mg/m², preferably from 1 to 5 mg/m². When this amount is too small, the lubricant may not be present homogeneously, while if it is too large, the magnetic layer may stick to the magnetic head or a magnetic head cylinder.

When the lubricant is contained in the magnetic layer, its amount is preferably from 0.1 to 20% by weight based on the weight of the magnetic powder. When the amount of the lubricant is less than 0.1% by weight, the desired effects cannot be achieved. When it exceeds 20% by weight, strength of the magnetic layer may decrease or the magnetic head tends to be contaminated.

In the case of the ferromagnetic metal thin film, the magnetic layer is formed by vacuum deposition, ion plating, sputtering or plating a ferromagnetic material which is commonly used for forming the ferromagnetic metal thin film such as Co, Ni, Fe, Co—Ni, Co—Cr, Co—P, Co—Ni—P, Fe—Co—B, Fe—Co—Ni, Co—Ni—Fe—B, Fe—Ni, Fe—Co, Co—Pt, Co—Ni—Pt, each of which may be combined with oxygen, on one surface or both surfaces of the nonmagnetic substrate. A thickness of the thus formed ferromagnetic metal thin film is preferably from 0.03 to 1 μm.

In the present invention, preferably the ferromagnetic metal thin film comprising Co, Ni and O, more preferably comprising Co and Ni in a weight ratio of 97:3 to 60:40 is used, since the excellent effects are achieved when the lubricant is used with the Co—Ni—O ferromagnetic metal thin film.

The coating type magnetic layer is formed by mixing and dispersing the magnetic powder, the binder resin, the organic solvent and other necessary components to prepare the magnetic paint, and coating the magnetic paint on the nonmagnetic substrate such as the polyethylene terephthalate film, and drying it.

As the magnetic powder, any conventionally used magnetic powder, such as metal powder (e.g. γ-Fe₂O₃ powder, Fe₃O₄ powder, iron oxide powder of intermediate oxide between γ-Fe₂O₃ powder and Fe₃O₄ powder, cobalt-containing γ-Fe₂O₃ powder, cobalt-containing Fe₃O₄ powder, CrO₂ powder, Fe powder, Co powder, Fe—Ni—Cr alloy powder, etc.), barium ferrite powder, and the like may be used.

As the binder resin, any of binder resins which are used in conventional recording media, such as polyvinyl chloride, a copolymer comprising vinyl chloride, a cellulose resin, a polyurethane resin, a polyester resin, a polyvinyl butyral resin, a polyacryl resin, an epoxy resin, a phenol resin, an acrylic resin, a polyisocyanate compound, a polyepoxy compound and so on forth may be used.

As the organic solvent, any of solvents which are used in the preparation of a magnetic recording media, such as methyl isobutyl ketone, methyl ethyl ketone, cyclohexanone, toluene, ethyl acetate, tetrahydrofuran, dioxane, dimethylformamide and the like may be used independently or as a mixture of two or more of them.

The magnetic paint may optionally contain a conventionally used additive, such as an abrasive, an antistatic agent, a dispersant and the like.

A back coating layer may be formed on the opposite surface of the nonmagnetic substrate reverse to the magnetic layer. The back coating layer may be formed by mixing and dispersing a nonmagnetic powder, such as carbon black or calcium carbonate, a binder resin, such as polyvinyl chloride, or a copolymer comprising vinyl chloride, a urethane copolymer or a cellulose resin, in an organic solvent to prepare the back coating paint, coating the back coating paint on a surface of the nonmagnetic substrate reverse to the magnetic layer and drying the paint.

As the nonmagnetic substrate, a film of a plastic such as polyethylene terephthalate, polyethylene naphthalate, polycarbonate, polyimide or polyvinyl chloride, an aluminum alloy or a titanium alloy is preferably used. A shape of the nonmagnetic substrate may be a tape form, a sheet form, a disc form or a card form. The surface of the substrate may have protrusions.

While the present invention has been explained in connection with the lubricant to be used in the magnetic recording medium, the application of the lubricant of the present invention is not limited thereto. The lubricant of the present invention can be used with any material which requires the lubrication such as a sliding part of a machine.

PREFERRED EMBODIMENTS

The embodiments of the present invention will be explained. While the application to the magnetic recording medium will be explained hereinafter, the use, the preparation method, and the materials are not limited to those explained.

EXAMPLE 1

A polyethylene terephthalate film having a thickness of 10 μm was set in a vacuum vapor deposition apparatus, and a Co—Ni alloy was heated and evaporated under an oxygen gas pressure of $5\times10^{-5}$ torr and continuously deposited on the film at a slant incident angle to form a ferromagnetic metal thin film of Co—Ni—O (Co:Ni= 80:20) having a thickness of 0.2 μm on the polyethylene terephthalate film.

In the separate step, the perfluoropolyether having the terminal group of the formula:

—CF₂CH₂—(OCH₂CH₂)ₘ—OH (FOMBLIN Z DOL-TX manufactured by Montecatini; Molecular weight, 2200; Backbone: —(CF$_2$CF$_2$O)$_p$—(CF$_2$O)$_q$—) (220 parts by weight) and propylene oxide (35 parts by weight) were polymerized in an auto-clave to obtain the Compound A having a polyether chains of the formula:

—CF$_2$CH$_2$—(OCH$_2$CH$_2$)$_m$—(OC$_3$H$_6$)$_n$—OH at the both ends of the perfluoropolyether. By the analysis of the Compound A by NMR, it was found that m was 2 and n was 3.

Then, thionyl chloride (5.5 parts by weight) was added to the obtained Compound A (100 parts by weight) and the mixture was refluxed at 80° C. while stirring well, followed by evaporation off of excessive thionyl chloride to obtain the Compound B the molecular terminals of which were chlorinated. The polyether moiety of the Compound B was represented by the following formula:

—CF$_2$CH$_2$—(OCH$_2$CH$_2$)$_2$—(OC$_3$H$_6$)$_3$—Cl.

The thus obtained Compound B was dissolved in tetrahydrofuran to obtain a 0.2 wt. % solution of the Compound B. In this solution, the above described polyethylene terephthalate film on which the ferromagnetic metal thin film of Co—Ni—O had been formed was dipped and dried to apply the lubricant. Then, the film was slit to a width of 8 mm to obtain a video tape.

EXAMPLE 2

Metal sodium (1.9 parts by weight) was dissolved in methanol (2.5 parts by weight). To the solution, the Compound B prepared in Example 1 (100 parts by weight) was added and reacted at 80° C. for 8 hours while stirring well to obtain the Compound C the terminal groups of which were methoxylated. The alkyl ether moiety of the Compound C was represented by the following formula:

—CF$_2$CH$_2$—(OCH$_2$CH$_2$)$_2$—(OC$_3$H$_6$)$_3$—OCH$_3$.

In the same manner as in the step for coating the compound on the ferromagnetic metal thin film in Example 1 except that the obtained Compound C was used in place of the Compound B of Example 1 and the 0.2 wt. % solution of the obtained Compound C was used, the Compound C in tetrahydrofuran was coated on the ferromagnetic metal thin film and a video tape was produced.

EXAMPLE 3

To the Compound A prepared in Example 1 (100 parts by weight), trimethylmethoxysilane (9 parts by weight) was added and reacted at 100° C. for 8 hours while stirring, followed by evaporation off of excessive trimethylsilane and by-produced methanol to obtain the Compound D the terminal groups of which were trimethylsilylated. The alkylether moiety of the Compound D was represented by the following formula:

—CF$_2$CH$_2$—(OCH$_2$CH$_2$)$_2$—(OC$_3$H$_6$)$_3$—OSi(CH$_3$)$_3$.

In the same manner as in the step for coating the compound on the ferromagnetic metal thin film in Example 1 except that the obtained Compound D was used in place of the Compound B of Example 1 and the 0.2 wt. % solution of the obtained Compound D in tetrahydrofuran was used, the Compound D was coated on the ferromagnetic metal thin film and a video tape was produced.

EXAMPLE 4

After thoroughly replacing the internal atmosphere of the reactor with nitrogen, FOMBLIN Z DOL-TX (perfluoropolyether manufactured by Montecatini) (100 parts by weight), n-octadecyldimethylchlorosilane (35 parts by weight), chloroform (75 parts by weight) and pyridine (16 parts by weight) were charged and reacted under nitrogen stream at room temperature for 8 hours while vigorously stirring. Then, the pyridine salt was repeatedly extracted and removed with chloroform to obtain the Compound E. The alkylether moiety of the Compound E was represented by the following formula:

—CF$_2$CH$_2$—(OCH$_2$CH$_2$)$_2$—OSi(CH$_3$)$_2$—(CH$_2$)$_{17}$CH$_3$.

In the same manner as in the step for coating the compound on the ferromagnetic metal thin film in Example 1 except that the 0.2 wt. % solution of the obtained Compound E in tetrahydrofuran was used in place of the 0.2 wt. % solution of the Compound B in tetrahydrofuran, the Compound E was coated on the ferromagnetic metal thin film and a video tape was produced.

EXAMPLE 5

The perfluoropolyether having the terminal group of the formula:

—CF$_2$CH$_2$—(OCH$_2$CH$_2$)$_m$—OH wherein m is 2 or 3 on the average (FOMBLIN Z DOL-TX manufactured by Montecatini; Molecular weight, 2200) (220 parts by weight) was heated to 80° C. under atmospheric pressure. Then, through this polymer, ethylene oxide was bubbled gradually till the index m in the above perfluoropolyether reached about 5 during which the reaction was monitored through the weight increase and so on.

With this product, a large excess amount of n-butyl bromide (68.5 parts by weight) was reacted in the presence of NaOH by a conventional method to obtain the Compound F having, at the both ends of the perfluoropolyether, the ether bond-containing alkyl chain of the formula:

—CF$_2$CH$_2$—(OCH$_2$CH$_2$)$_5$—O—(CH$_2$)$_3$—CH$_3$.

Figure 2:
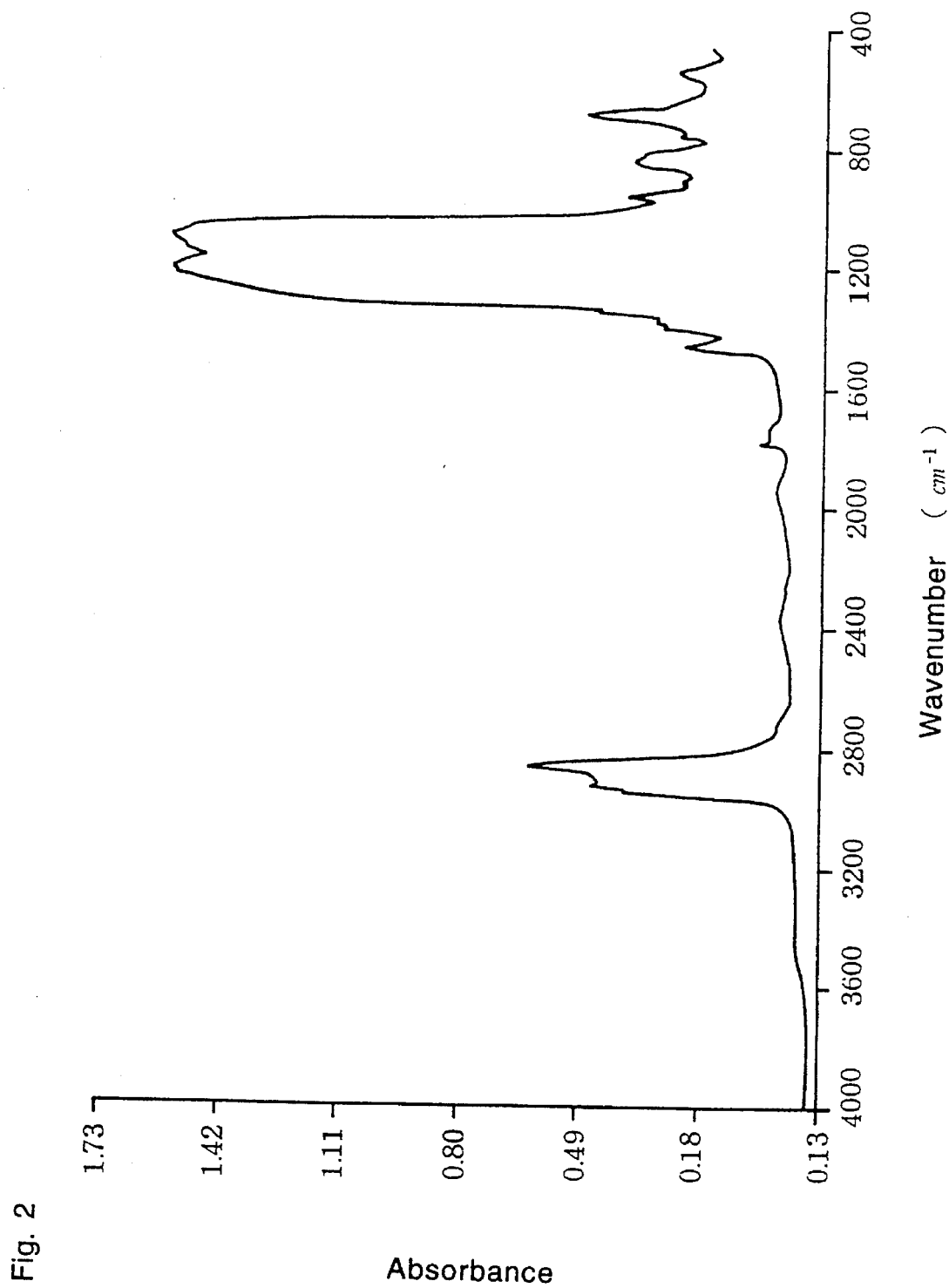
FIG. 2 is an IR spectrum of a lubricant prepared in Example 5.

By the analysis of the Compound F by NMR and IR, it was found that m was 5 on the average. The NMR spectrum and IR spectrum of the Compound F are shown in FIGS. 1 and 2, respectively.

In the same manner as in the step for coating the compound on the ferromagnetic metal thin film except that the 0.2 wt. % solution of the obtained Compound F in tetrahydrofuran was used in place of the 0.2 wt. % solution of the Compound B in tetrahydrofuran, the Compound E was coated on the ferromagnetic metal thin film and a video tape was produced.

EXAMPLE 6

In the same manner as in the synthesis of the Compound F in Example 5 except that 88 parts by weight of a perfluoroalkyl alcohol (C$_7$F$_{15}$H$_2$CH$_2$OH, FLUOWET 600 manufactured by Hoechst Japan; Molecular weight, 414) was used in place of the perfluoropolyether, 2.0 ethylene oxide molecules were added per one molecule and then the product was etherified with n-butyl bromide to obtain the Compound G of the formula:

$C_7F_{15}CH_2CH_2OCH_2CH_2OCH_2CH_2OC_4H_9$.

Figure 3:
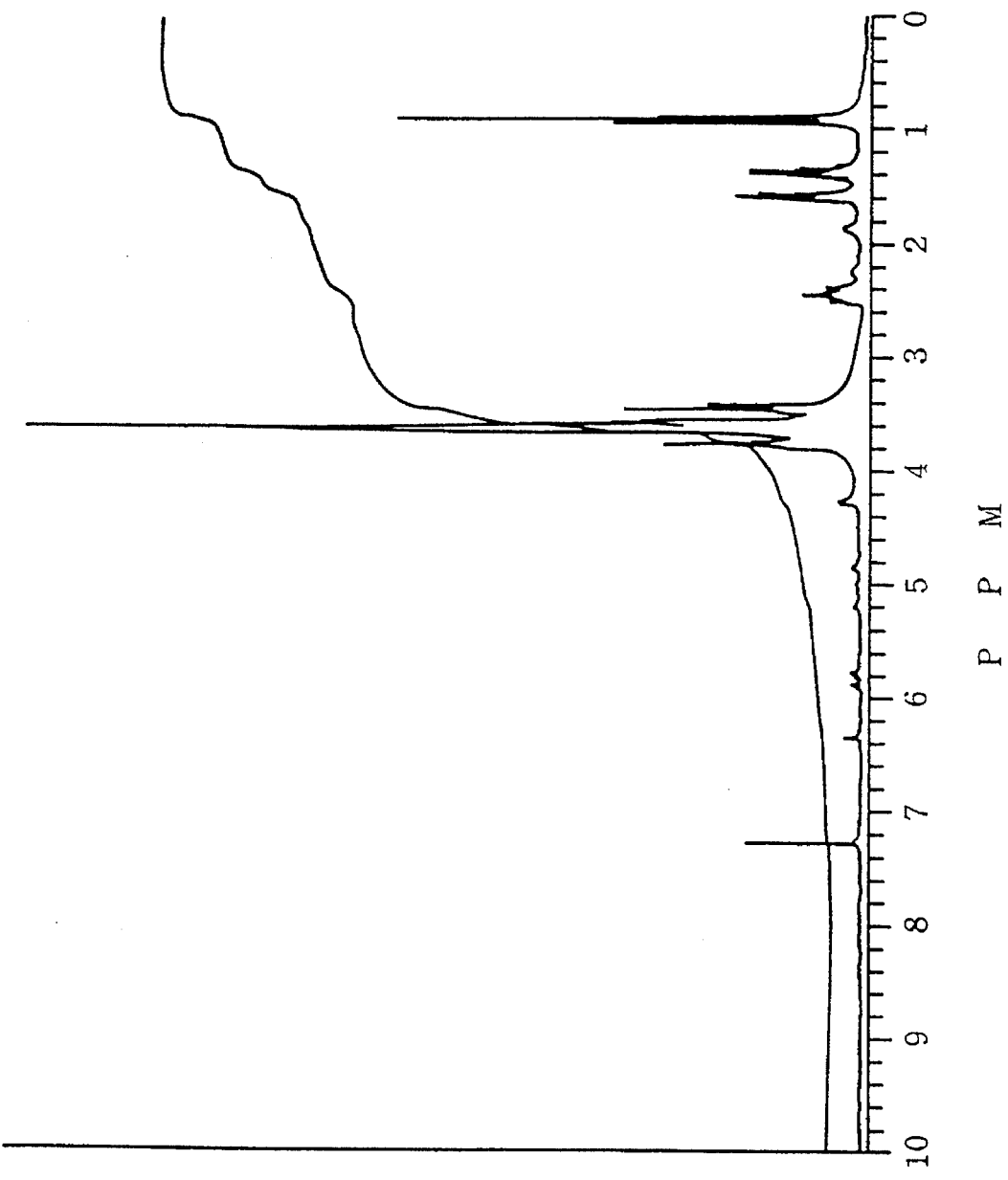
FIG. 3 is a NMR spectrum of a lubricant prepared in Example 6.
Figure 4:
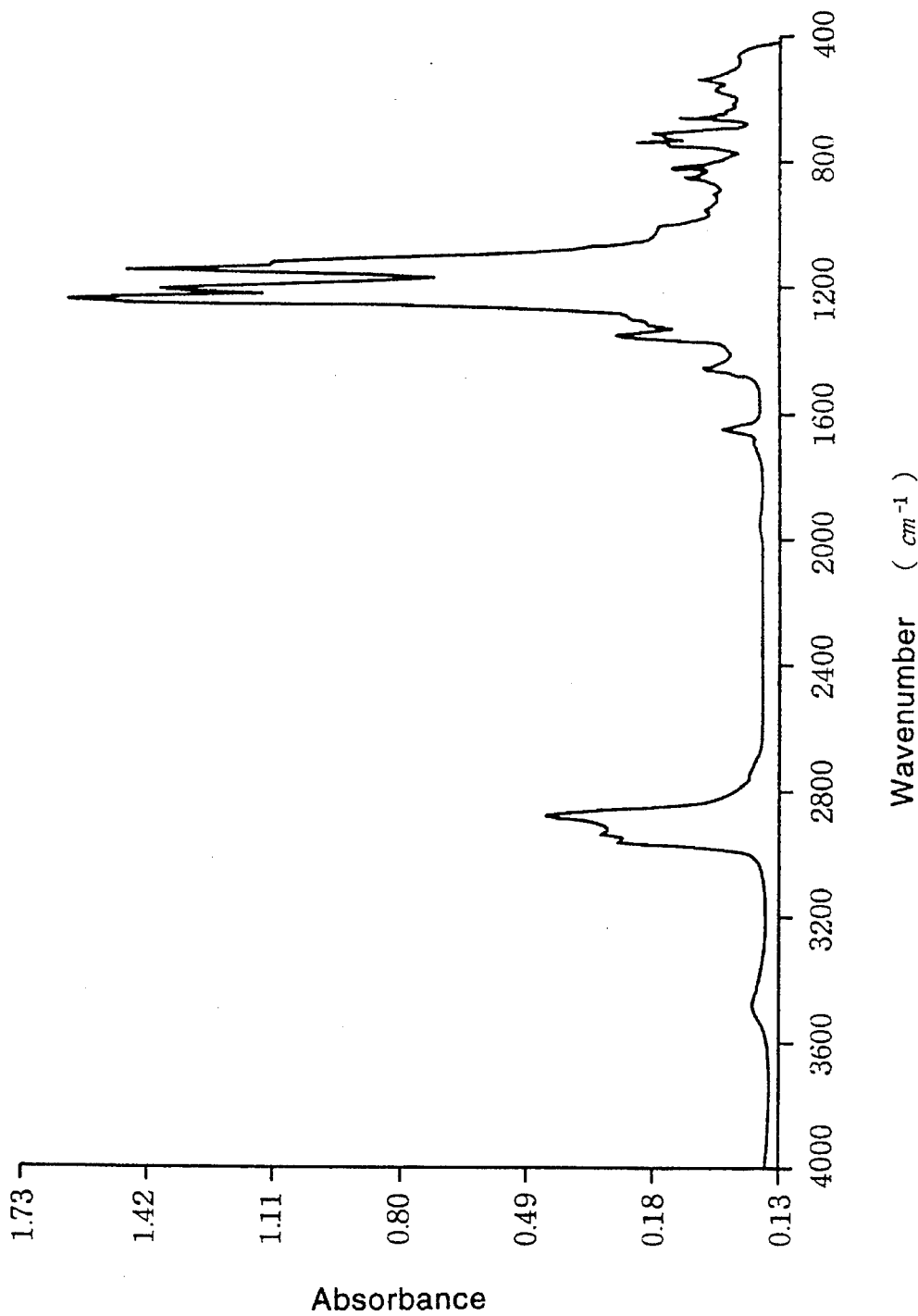
FIG. 4 is an IR spectrum of a lubricant prepared in Example 6.

By the analysis of the Compound G by NMR and IR, its chemical structure was confirmed. Its boiling point was 175° C./0.1 torr. The NMR spectrum and IR spectrum of the Compound F are shown in FIGS. 3 and 4, respectively.

In the same manner as in the step for coating the compound on the ferromagnetic metal thin film in Example 1 except that the 0.2 wt. % solution of the obtained Compound G in tetrahydrofuran was used in place of the 0.2 wt. % solution of the Compound B in tetrahydrofuran, the Compound G was coated on the ferromagnetic metal thin film and a video tape was produced.

EXAMPLE 7

In the same manner as in the step for coating the compound on the ferromagnetic metal thin film in Example 1 except that a solution containing 0.1 wt. % of the Compound F prepared in Example 5 and 0.1 wt. % of the Compound G prepared in Example 6 in tetrahydrofuran was used in place of the 0.2 wt. % solution of the Compound B in tetrahydrofuran, the Compounds F and G were coated on the ferromagnetic metal thin film and a video tape was produced.

EXAMPLE 8

In the same manner as in the synthesis of the Compound F in Example 5 except that 1-bromododecane (125 parts by weight) was used in place of n-butyl bromide, the Compound H having, at the both ends of the perfluoropolyether, the ether bond-containing alkyl chain of the formula:

$-CF_2CH_2-(OCH_2CH_2)_m-O-(CH_2)_{11}-CH_3$.

In the same manner as in the step for coating the compound on the ferromagnetic metal thin film in Example 1 except that the 0.2 wt. % solution of the obtained Compound H in tetrahydrofuran was used in place of the 0.2 wt. % solution of the Compound B, the Compound H in tetrahydrofuran was coated on the ferromagnetic metal thin film and a video tape was produced.

EXAMPLE 9

The fluoroalkyl alcohol of the formula: $CF_3(CF_2)_5CH_2CH_2-$ OH (36.4 parts by weight) and ethylene oxide were reacted by the conventional method to obtain the Compound I having the polyether chain at the end of the fluoroalkyl chain, which was represented by the formula:

$CF_3(CF_2)_5CH_2CH_2(OCH_2CH_2)_m-OH$.

During the reaction, the product was analyzed by NMR, and the reaction was terminated when m reached about 2.

With this Compound I, a large excess amount of n-butyl bromide (69 parts by weight) was reacted by a conventional method to obtain the Compound J having the alkyl chain at the end of the fluoroalkyl chain and at least one ether bond including the linking part, which was represented by the formula:

$CF_3(CF2)_5CH_2CH_2(OCH_2CH_2)_m-O(CH_2)_3CH_3$

The thus obtained Compound J and a perfluoropolyether (FOMBLIN Z DOL manufactured by Montecatini; Molecular weight, 2200; Backbone: $-(CF_2CF_2O)_p-(CF_2O)_q-$) in a weight ratio 1:2 was dissolved in FREON to obtain a 0.1 wt. % solution of the Compound J and the perfluoropolyether.

In the same manner as in the step for coating the compound on the ferromagnetic metal thin film in Example 1 except that the above prepared solution was used in place of the 0.2 wt. % solution of the Compound B in tetrahydrofuran, the Compound J and the perfluoropolyether were coated on the ferromagnetic metal thin film and a video tape was produced.

EXAMPLE 10

In the same manner as in the synthesis of the Compound in Example 9 except that 1-bromododecane (125 parts by weight) was used in place of n-butyl bromide, the Compound K having the alkyl chain at the end of the fluoroalkyl chain and at least one ether bond including the linking part, which was represented by the formula:

$CF_3(CF2)_5CH_2CH_2(OCH_2CH_2)_m-O(CH_2)_{11}CH_3$ was obtained.

The thus obtained Compound K and a perfluoropolyether (FOMBLIN Z DOL manufactured by Montecatini; Molecular weight, 2200; Backbone: $-(CF_2CF_2O)_p-(CF_2O)_q-$) in a weight ratio 1:2 was dissolved in FREON.

In the same manner as in the step for coating the compound on the ferromagnetic metal thin film in Example 9 except that the 0.1 wt. % solution of the obtained Compound K in FREON and the perfluoropolyether was used in place of the 0.1 wt. % solution of the Compound J and the perfluoropolyether in FREON, the Compound K and the perfluoropolyether were coated on the ferromagnetic metal thin film and a video tape was produced.

EXAMPLE 11

A composition of the following components:

| | |
|---|---|
| α-Fe magnetic powder | 100 wt. parts |
| MR-1100 (polyvinyl chloride resin manufactured by Nippon Zeon) | 15 wt. parts |
| N-2309 (polyurethane resin manufactured by Nippon Polyurethane Ind.) | 10 wt. parts |
| Carbon black | 1 wt. part |
| α-Al$_2$O$_3$ | 0.5 wt. part |
| Cyclohexanone | 150 wt. parts |
| Toluene | 150 wt. parts. | was mixed and dispersed in a ball mill for 72 hours. To the mixture, Colonate L (a trifunctional low molecular weight isocyanate compound manufactured by Nippon Polyurethane Ind.) (6 parts by weight) was added and mixed for 0.5 hour. Finally, the Compound B prepared in Example 1 (3 parts by weight) was added to obtain a magnetic paint.

The magnetic paint was coated on a polyethylene terephthalate film having a thickness of 10 μm at a dry thickness of 3 μm and dried to form a magnetic layer. Thereafter, the film was slit at a width of 8 mm to obtain a video tape.

EXAMPLE 12

In the same manner as in Example 11 except that, in the preparation of the magnetic paint, the Compound F prepared in Example 5 was used in place of the Compound B, the video tape was produced.

EXAMPLE 13

In the same manner as in Example 8 except that, in the preparation of the magnetic paint, the Compound K prepared in Example 10 was used in place of the Compound B, a video tape was produced.

Comparative Example 1

In the same manner as in the step for coating the compound on the ferromagnetic metal thin film in Example 1 except that the 0.2 wt. % solution of the Compound A prepared in Example 1 in methanol in place of the 0.2 wt. % solution of the Compound B in tetrahydrofuran, the Compound A was coated on the ferromagnetic metal thin film and a video tape was produced.

Comparative Example 2

In the same manner as in the step for coating the compound on the ferromagnetic metal thin film in Example 1 except that the 0.2 wt. % solution of a perfluoropolyether having methyl ester groups at both molecular ends (FOMBLIN Z DEAL manufactured by Montecatini; Molecular weight, about 2000; Backbone: —$(CF_2CF_2O)_p$—$(CF_2O)_q$—) in tetrahydrofuran in place of the 0.2 wt. % solution of the Compound B, the perfluoropolyether was coated on the ferromagnetic metal thin film and a video tape was produced.

Comparative Example 3

Linolic acid (100 parts by weight) and 1,1-dihydroperfluoro-1-octanol (150 parts by weight) were reacted in the presence of stannous oxide as a catalyst to obtain 1,1-dihydroperfluorooctyl linolate, which had a boiling point of 170° C./0.1 torr.

In the same manner as in the step for coating the compound on the ferromagnetic metal thin film in Example 1 except that the 0.2 wt. % solution of 1,1-dihydroperfluorooctyl linolate in tetrahydrofuran which was prepared in Comparative Example 3 in place of the 0.2 wt. % solution of the Compound B in tetrahydrofuran, 1,1-dihydroperfluorooctyl linolate was coated on the ferromagnetic metal thin film and a video tape was produced.

Comparative Example 4

In the same manner as in the preparation of the magnetic paint in Example 8 except that myristic acid (5 parts by weight) and butyl stearate (1 part by weight) were used in place of the Compound B, a video tape was used.

With the video tape produced in each of Examples and Comparative Examples, still durability, corrosion resistance and storage stability were evaluated by the following methods.

Still durability

The still durability is evaluated by measuring a still time at which an reproducing output decreased by 6 dB from the original output using a 8 mm VTR (VM-H38 manufactured by Hitachi Limited) at 20° C., 50% RH.

Corrosion resistance

The corrosion resistance is evaluated by measuring a percentage of the decrease of reproducing output after storing the video tape at 60° C., 70% RH for one week.

Storage stability

The storage stability is evaluated by calculating a change rate between a coefficient of friction just after the coating treatment and that after storing the video tape at 60° C., 70% RH for one week.

A coefficient of friction is measured by winding the video tape around a SUS cylinder having a diameter of 6 mm and reciprocally sliding the tape at a rate of 10 cm/sec. under a load of 5 g. The coefficient of friction at 10th pass is used.

The results are shown in Table 1.

TABLE 1

| Example No. | Corrosion resistance (%) | Still time (min) | Coefficient of friction Original value | Coefficient of friction After storage |
|---|---|---|---|---|
| Ex. 1 | 12 | 70 | 0.24 | 0.26 |
| Ex. 2 | 9 | 75 | 0.22 | 0.23 |
| Ex. 3 | 12 | 85 | 0.23 | 0.24 |
| Ex. 4 | 11 | 80 | 0.21 | 0.23 |
| Ex. 5 | 9 | 110 | 0.23 | 0.25 |
| Ex. 6 | 9 | 110 | 0.41 | 0.45 |
| Ex. 7 | 7 | >120 | 0.21 | 0.23 |
| Ex. 8 | 8 | 80 | 0.24 | 0.26 |
| Ex. 9 | 8 | 80 | 0.23 | 0.23 |
| Ex. 10 | 9 | 95 | 0.22 | 0.24 |
| Ex. 11 | 10 | >120 | 0.24 | 0.25 |
| Ex. 12 | 8 | >120 | 0.21 | 0.23 |
| Ex. 13 | 10 | >120 | 0.25 | 0.26 |
| C. Ex. 1 | 15 | 50 | 0.27 | 0.28 |
| C. Ex. 2 | 17 | 45 | 0.22 | Stuck |
| C. Ex. 3 | 16 | 55 | 0.42 | >0.6 |
| C. Ex. 4 | 20 | >120 | 0.21 | 0.53 |

As seen from Table 1, the video tapes produced by the present invention (Examples 1–13) had the longer still time, better corrosion resistance, and the smaller coefficient of friction than the video taped produced in Comparative Examples 1–4, from which it is understood that the lubricant according to the present invention can provide the stable lubrication property for a long time.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lubricant compound which comprises carbon, hydrogen, fluorine, etheric oxygen atoms, and at least one perfluoropolyether chain of the formula (A):

$$—(C_nF_{2n}O_m)— \qquad (A)$$

wherein n is an integer of 1 to 10 and m is an integer of at least 1, a perfluoroalkyl chain of the formula (B):

$$—C_nF_{2n}— \qquad (B)$$

wherein n is an integer of 1 to 15, and a polyether chain of the formula (C):

$$—(C_nH_{2n}O)_m— \qquad (C)$$

wherein n is an integer of 1 to 6 and m is an integer of at least 1, in a combination of (C)-(A)-(C) in which said chains (A) and (C) are bonded through a linkage comprising a —$CH_2$— group, a combination of (B)-(C) in which said chains (B) and (C) are bonded through a linkage comprising a —CH$_2$— group, or combinations of (A)-(C) and (B)-(C) in which said chains (A) and (C), and said chains (B) and (C) are each bonded through a linkage comprising a —CH$_2$— group in a molecule.

2. The lubricant compound according to claim 1, wherein said chain combination of (A) and (C), or said chain combination of (B) and (C) are bonded by an etheric oxygen atom.

3. The lubricant compound according to claim 2, wherein at least one molecular end has a group selected from the group consisting of —OR$_1$, in which R$_1$ is an alkyl or fluoroalkyl group having from 1 to 18 carbon atoms, and —OSi(CH$_3$)$_2$R$_2$, in which R$_2$ is an alkyl group having from 1 to 30 carbon atoms.

4. The lubricant compound according to claim 1, wherein said chain combination (A) and (C) is bonded by an etheric oxygen atom, and at least one molecular end is —Cl.

5. The lubricant compound according to claims 3 or 4, which has a molecular weight of from 300 to 10,000.

* * * * *